United States Patent Office 3,721,459
Patented Mar. 20, 1973

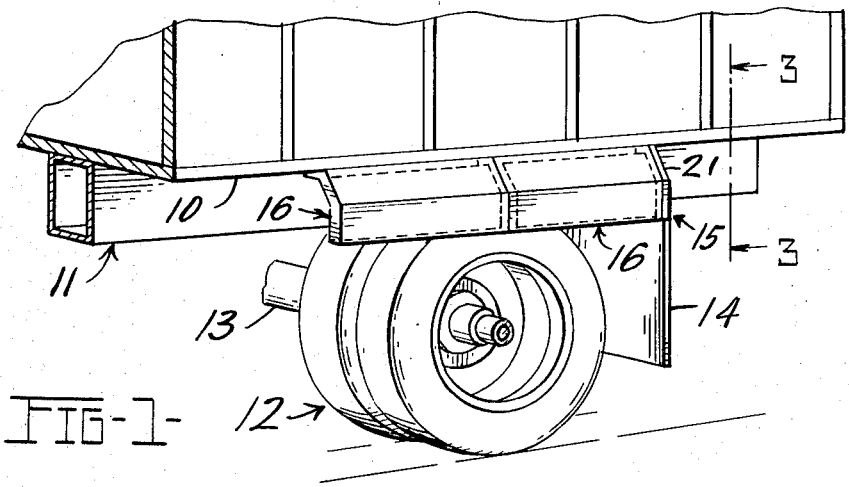
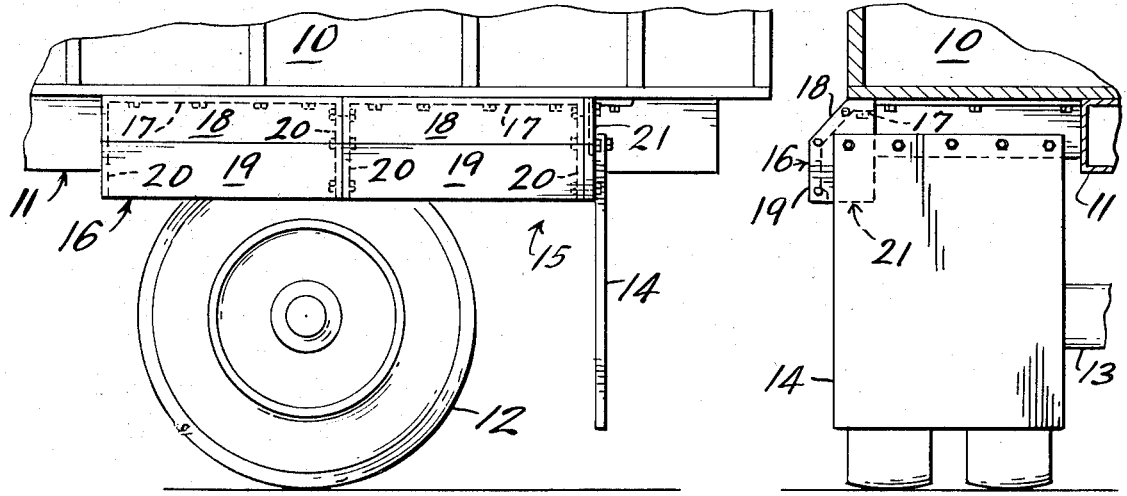
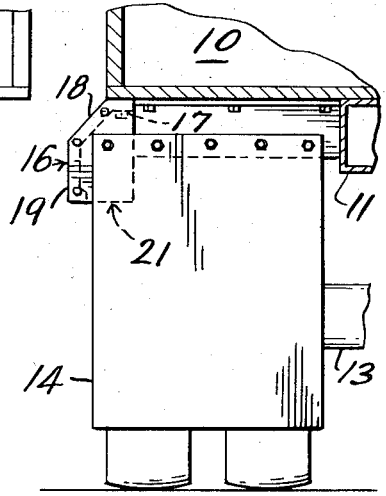
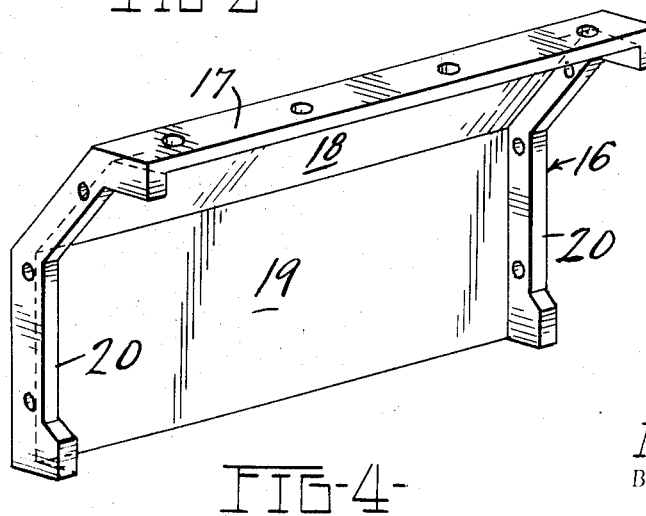
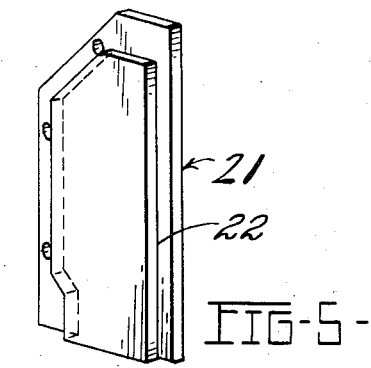

3,721,459
SPRAY SHIELD FOR HIGHWAY VEHICLE WHEELS
Harlan L. Lea, Wapakoneta, Ohio, assignor to Koneta Rubber Company, Inc., Wapakoneta, Ohio
Filed Mar. 4, 1971, Ser. No. 120,863
Int. Cl. B62d 25/16
U.S. Cl. 280—154.5 R                    3 Claims

ABSTRACT OF THE DISCLOSURE

A spray shield for the rear wheels or drive wheels of a highway vehicle. The shield consists of one or more units. Each unit has a mounting flange, an outwardly and downwardly extending shoulder and a vertical skirt at the outer edge of the shoulder. Each unit has assembly means at each end. The shield is to be mounted on the vehicle chassis or underside of the body. The shield extends longitudinally of and overlies the upper outer side of the vehicle wheel, to intercept and divert spray thrown off of the top of the wheel or the vehicle body. Two or more units may be assembled in end-to-end relationship. An end plate is adapted to be mounted by the assembly means at an end of the shield. The splash shield is preferably constructed from a flexible or semi-flexible material such as rubber, flexible plastic, fabrics or fibre.

BACKGROUND OF THE INVENTION

The use of mud flaps, particularly on the rear wheels of highway trucks and trailers, is required by the majority of the State statutes in order to prevent road surface material such as water, mud, snow and other objects such as pebbles and the like from being thrown backwardly by the wheels of such vehicles and against the windshields and body surfaces of following and passing vehicles. Such mud flaps, however, often act as splash boards causing heavy "side" spray and do not effectively prevent the spray of water which often carries mud and other materials, so that in inclement weather even a vehicle equipped with mud flaps presents a hazard to both following and oncoming drivers. This side throw condition is further magnified by material thrown against the bottom or underside of the body of the vehicle by the top arc of the wheels and then diverted outwardly.

The side throwing of road surface material is seldom, if ever, "off" the wheel sides. Wheel "throw-off" is mostly in planes parallel to the axis of rotation of the wheels and covers an area whose cross section is not much thicker than that of the wheels. This throw-off is tangent to the tread surface of the wheel, and occurs through a concentric arc defined by a sector of about 250 degrees of the wheel circle. The 250 degree sector starts just rearward of where the wheel contacts the road surface. The greatest "throw-off" force occurs through the back 180 degrees of the wheel rotation. The "throw-off" angles upwardly forming an angle in the region of 17 degrees to 22 degrees upward relative to a plane tangent to the wheel surface. Approximately 50% of all the wheel surface "pick-up" and/or "throw-off" is in the zone formed by the top 180 degree sector of the wheel. Approximately 95% of side splash is caused when the throw-off in the top 180 degree sector hits the underside of the body of the vehicle, a flat mud flap, or other flap surface which lies across the wheel plane area. These flat surfaces act as directional splash boards and create a sheet of "throw-off" rather than a disseminated or "shower" type of "flow." This concentrated sheet of flow is what creates the most serious driving hazard.

The spray shield, according to the present invention, intercepts this sheet of throw-off, and diverts it downward. The spray shield tends to eliminate, by downward directional diversion, much of the side-splash or throw-off caused by the wheels of the vehicle. The balance of the side splash which still does spread broadly from the vehicle will be a lighter spray and not a solid or semi-solid mass. Small pebbles, sand, etc., will be completely diverted downward toward the ground and their force nullified as a hazard to approaching or passing vehicles.

It is the principal object of the instant invention to provide a versatile spray shield which can readily be mounted on or removed from the chassis or body of a highway vehicle and which will intercept the spray and other materials otherwise thrown off from the wheels and/or projected in an outwardly direction from the vehicle. The spray shield reduces the problem of obscuring the vision of following, passing, or oncoming drivers who may be attempting to pass the vehicle in question.

It is yet another and more specific object of the invention to provide a spray shield comprising one or more identical units each of which can be mounted individually on the body or chassis of the vehicle or which can be connected to each other longitudinally in order to provide a longer spray shield when desired. The units are also so designed as to enable the same basic element to be mounted on either side of the vehicle and, if desired, to be closed at either or both ends by the utilization of a readily mountable end plate.

BRIEF DESCRIPTION OF THE DRAWINGS

FIG. 1 is a fragmentary view in prespective showing a portion of a truck or trailer equipped with spray shields embodying the invention;

FIG. 2 is a fragmentary view in side elevation showing a spray shield embodying the invention as mounted on a truck or trailer;

FIG. 3 is a fragmentary rear view in elevation taken from the right side of FIG. 2;

FIG. 4 is an isometric view on a larger scale illustrating one of the units of which a spray shield embodying the invention is comprised; and FIG. 5 is an isometric view showing an end plate adapted to be mounted at either the front or the rear side of a spray shield embodying the invention.

DESCRIPTION OF A PREFERRED EMBODIMENT

In FIG. 1 the left or driver's side of a truck or trailer body 10 is fragmentarily illustrated and its chassis side member 11 is shown. A dual wheel 12 is shown on an axle 13 to illustrate the conventional rear wheels of a highway truck or trailer. A conventional mud flap 14 is shown at the rear side of the dual wheel 12.

A spray shield embodying the invention is generally indicated by the reference number 15 and, in the drawings, two spray shield units 16 are shown in end-to-end arrangement overhanging the dual wheel 12. The spray shield 15 is shown as mounted on the under side of the edge of the vehicle body 10 by mounting flanges 17 of the units 16. Although two of the units 16 are shown in end-to-end relationship to make up the spray shield 15 it will be appreciated, of course, that in some vehicles it may only be necessary to use one unit 16 on each side of the vehicle or, in other instances, as for example where the vehicle has dual axles and/or of the sliding tandem type, it may be necessary to use three or even four or more of the spray shield units 16 arranged in end-to-end relationship in order to form the spray shield 15.

Each of the spray shield units 16 not only has its individual mounting flange 17 but also comprises an outwardly and downwardly extending shoulder 18 and a vertical skirt 19 depending from the outer edge of the shoulder 18. Each of the shield units 16 is also provided with an assembly flange 20 at each end by which adjacent spray shield units 16 may be attached to each other as shown in FIG. 2. Because the spray shield units 16 have assembly means or flanges 20 at each end, they may serve either on the right or the left side of a vehicle merely by being reversed relative to the vehicle.

Each spray shield unit 16 is adapted to receive a vertical end plate 21 of a proper size and configuration to match one of the assembly flanges 20 by which the end plate 21 is mounted and held at either or both ends of either a single spray shield unit 16 or at either or both ends of the aligned spray shield unit or units 16 such as are shown in FIGS. 1 and 2.

A spray shield 15 embodying the invention intercepts a very large portion of the spray of water and/or other materials thrown off by the wheels of the vehicle which otherwise is forced or thrown outwardly by impact of the wheel throw against the under side of the body of the vehicle or the mud flaps. Because of the inclined shoulder 18, and the skirt 19, the spray and/or other material thrown off by the wheels 12 is diverted downwardly and outwardly thereby washing the inner sides of the shoulders 18 and the skirts 19 to prevent buildup of dirty water or slush.

Preferably, the spray shield 15 is constructed of flexible or semi-flexible material such as rubber, flexible plastic, semi-flexible plastic, fabrics or fibre.

The end plate 21 may include a central raised portion 22 which is complementary with and is received by the adjacent assembly flange 20.

What I claim is:
1. A spray shield for a highway vehicle having a longitudinally extending body and road wheels mounted below such body, said spray shield comprising, in combination, a plurality of spray shield units connected together in longitudinal end-to-end relation, said spray shield units being constructed of a semi-flexible material, each of said spray shield units including a longitudinally extending and planar mounting flange for mounting on a planar surface of such body, a laterally outwardly and downwardly extending shoulder coextensive with and secured to said mounting flange, a downwardly extending skirt coextensive with and secured to the lower edge of said shoulder, said skirt extending downwardly to a location below the tread area of tires mounted on such wheels, and means for connecting said shield units in longitudinal end-to-end relation including assembly flanges extending inwardly adjacent the ends of each of said shield units, said spray shield including an end plate mounted on the rear end of the rearward one of said spray shield units.

2. A spray shield according to claim 1, wherein said assembly flanges extend inwardly from said shoulder and said skirt.

3. A spray shield according to claim 1, wherein said end plate includes a central raised portion which is complementary with an adjacent assembly flange.

References Cited
UNITED STATES PATENTS
2,940,773   6/1960   Eaves _____ 280—154.5 R BENJAMIN HERSH, Primary Examiner
R. R. SONG, Assistant Examiner